M. De GRAFF.
Coffee-Pot Attachment.
No. 99,068.
Patented Jan. 25, 1870.
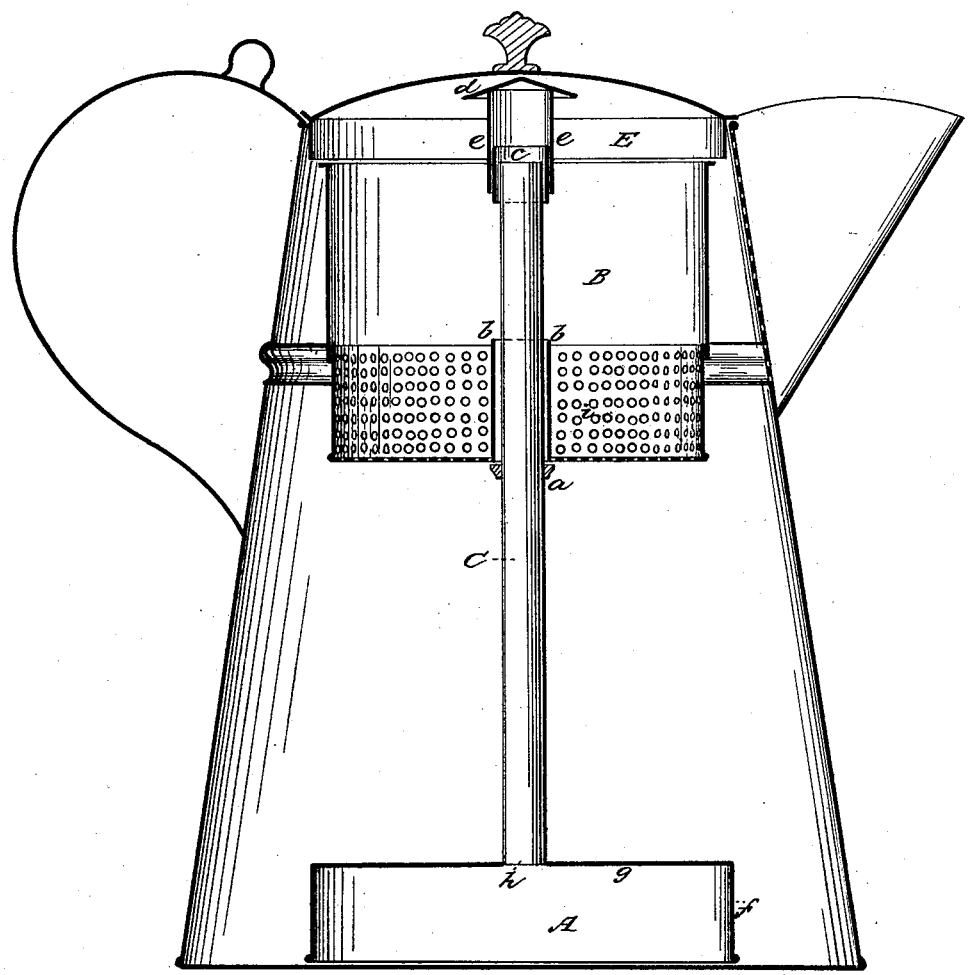
WITNESSES:
E. A. West.
Olb. Bond
INVENTOR:
Marinus De Graff.

United States Patent Office.

MARINUS DE GRAFF, OF CHICAGO, ILLINOIS.

Letters Patent No. 99,068, dated January 25, 1870.

COFFEE-POT ATTACHMENT.

The Schedule referred to in these Letters Patent and making part of the same.

*To all whom it may concern:*

Be it known that I, MARINUS DE GRAFF, of Chicago, in the State of Illinois, have invented a new and useful Attachment for Coffee-Pots; and I do hereby declare that the following is a full, clear, and exact description thereof, reference being had to the accompanying drawings, making part of this specification, consisting of a single figure, showing my attachment within a coffee-pot, ready for use, all being shown in section.

To enable others skilled in the art to make and use my attachment for coffee-pots, I proceed to describe the construction and operation of the same.

The several parts may be made of tin.

The lower part A consists of two pieces, the top $g$ being a disk of metal, having a small orifice, $h$, in the centre, and the side piece $f$ is about one inch in width, and is securely fastened to $g$.

The diameter of $g$ is a little less than the diameter of the top of the coffee-pot with which the attachment is to be used.

The part A is open at the bottom.

C is a tube, soldered to $g$, around the orifice $h$.

B is a receptacle for the ground coffee.

As shown in the drawings, the bottom and the lower portion of this receptacle are made of perforated tin $i$, while the upper part is made of common tin.

The bottom of the receptacle has an orifice, around which is soldered the tube $b$, which is a little larger than C.

The receptacle B rests upon a collar, $a$, which is secured to the tube C.

E is the flange of the cover of the coffee-pot, and is no part of my device.

$c$ is a short tube, which fits over C.

$e$ $e$ are two short strips of metal, fastened to $c$, and support the deflector $d$, which is secured to the strips $e$ $e$.

The diameter of B is a little less than that of the coffee-pot with which it is to be used.

In use, my attachment is placed within the coffee-pot, with which it is to be used, with the requisite quantity of water. The ground coffee is then put into the receptacle B, and the coffee-pot is placed where the water will boil. When boiling, hot water will be forced from within A, up through the tube C, and, striking against the deflector $d$, will be showered upon the ground coffee in B, which operation will continue so long as the boiling continues.

It is obvious that when this device is used, cold water may be put into the coffee-pot, and it will not come in contact with the coffee until it boils, or, if desired, hot water may be used at first, being poured upon the ground coffee in B. In either case, the boiling may be continued until the strength of the coffee has been sufficiently extracted.

The receptacle B may be made without any perforations in the side.

My device can be made of various sizes, and put upon the market detached from the coffee-pot, and parties can use it without being at the expense of purchasing new coffee-pots.

It can be readily removed from the coffee-pot, to be cleaned. The receptacle B can also be removed from the tube C, first removing $c$.

By the use of this device, coffee can be made, extracting the strength without directly boiling the coffee, and clear coffee can always be had.

The coffee-pot shown in the drawings forms no part of my invention, its only purpose being to aid in illustrating the operation of my attachment, though my device is to be used in connection with some form of coffee-pot.

Having thus fully described my invention,

What I claim as new, and desire to secure by Letters Patent, is as follows:

The herein-described apparatus, consisting of the tube C, having the enlarged base A, with the perforated reservoir B and deflector $d$, all constructed and arranged for use in an ordinary coffee-pot, substantially as set forth.

MARINUS DE GRAFF.

Witnesses:
  E. A. WEST,
  A. W. BOND.